(12) United States Patent
Breen et al.

(10) Patent No.: US 12,481,535 B2
(45) Date of Patent: Nov. 25, 2025

(54) RESOURCE MANAGEMENT

(71) Applicant: Immersive Labs Holdings Limited, Bristol (GB)

(72) Inventors: Kevin Breen, Bristol (GB); Steven Fenn, Bristol (GB); Martin Grenfell, Bristol (GB); Matthew Parven, Bristol (GB)

(73) Assignee: Immersive Labs Holdings Limited, Bristol (GB)

(*) Notice: Subject to any disclaimer, the term of this patent is extended or adjusted under 35 U.S.C. 154(b) by 392 days.

(21) Appl. No.: 18/048,693

(22) Filed: Oct. 21, 2022

(65) Prior Publication Data

US 2023/0062919 A1   Mar. 2, 2023

Related U.S. Application Data

(63) Continuation of application No. PCT/GB2021/050956, filed on Apr. 21, 2021.

(30) Foreign Application Priority Data

Apr. 23, 2020 (GB) ...................... 2005974

(51) Int. Cl.
*G06F 3/00* (2006.01)
*G06F 9/50* (2006.01)
*G06F 9/54* (2006.01)

(52) U.S. Cl.
CPC .............. *G06F 9/5033* (2013.01); *G06F 9/54* (2013.01)

(58) Field of Classification Search
CPC ...................................................... G06F 9/54
See application file for complete search history.

(56) References Cited

U.S. PATENT DOCUMENTS

| | | | |
|---|---|---|---|
| 6,173,322 B1 * | 1/2001 | Hu | H04L 67/1008 |
| | | | 709/224 |
| 9,560,037 B2 | 1/2017 | Bartz et al. | |

(Continued)

FOREIGN PATENT DOCUMENTS

| | | | | |
|---|---|---|---|---|
| CN | 1578320 A * | 2/2005 | ............... | H04L 9/40 |
| CN | 1607781 A * | 4/2005 | ............... | H04L 9/40 |
| WO | WO-2020001442 A1 * | 1/2020 | ......... | G06F 9/45558 |

OTHER PUBLICATIONS

Tom Van Cutsem, Proxies: Design Principles for Robust Object-oriented Intercession APIs. (Year: 2010).*

(Continued)

*Primary Examiner* — Lechi Truong
(74) *Attorney, Agent, or Firm* — EIP US LLP

(57) ABSTRACT

A method, system and computer program product for managing a plurality of resources in a digital environment via a framework. The framework comprises an API an intermediary component for proxying communication between the API and the resources; and at least one isolated network segment comprising the plurality of resources associated with the digital environment. The method comprises receiving through the API, an input requesting a state of the digital environment, and characteristics associated with the plurality of resources The characteristics of at least one of the plurality of resources are provided to the intermediary component, which are used by the intermediary component, to configure at least one of the resources.

14 Claims, 4 Drawing Sheets

(56) References Cited

U.S. PATENT DOCUMENTS

| | | | | |
|---|---|---|---|---|
| 9,954,763 B1* | 4/2018 | Ye | ............ | H04L 41/0813 |
| 10,853,129 B1* | 12/2020 | Sengupta | ............ | G06N 3/105 |
| 10,891,282 B1* | 1/2021 | Willingham | ............ | G06F 21/64 |
| 11,232,799 B1* | 1/2022 | Birthare | ............ | G10L 15/30 |
| 11,516,253 B1* | 11/2022 | Van Deman, V | ....... | H04L 63/10 |
| 2007/0098178 A1* | 5/2007 | Raikar | ............ | H04L 9/083 |
| | | | | 380/282 |
| 2011/0302312 A1 | 12/2011 | McRory | | |
| 2013/0047216 A1* | 2/2013 | Ajitomi | ............ | G06F 9/541 |
| | | | | 709/224 |
| 2013/0086696 A1* | 4/2013 | Austin | ............ | G06F 21/604 |
| | | | | 726/28 |
| 2013/0262696 A1* | 10/2013 | Watanabe | ............ | H04L 63/0281 |
| | | | | 709/238 |
| 2014/0115028 A1* | 4/2014 | Taylor | ............ | G06Q 10/10 |
| | | | | 709/202 |
| 2017/0064038 A1 | 3/2017 | Chen et al. | | |
| 2017/0083354 A1* | 3/2017 | Thomas | ............ | G06F 9/5061 |
| 2018/0322558 A1 | 11/2018 | Padmanabh et al. | | |
| 2019/0356661 A1* | 11/2019 | Hecht | ............ | H04L 9/0891 |
| 2020/0285715 A1* | 9/2020 | Seguin | ............ | H04L 63/10 |
| 2023/0073863 A1* | 3/2023 | Nicoara | ............ | H04L 67/1097 |

OTHER PUBLICATIONS

Haifa Mohamed, Detecting Cloud Virtual Network Isolation Security for Data Leakage. (Year: 2019).*
International Search Report and Written Opinion dated Jul. 29, 2021 for PCT Application No. PCT/GB2021/050956.

* cited by examiner

RESOURCE MANAGEMENT

CROSS-REFERENCE TO RELATED APPLICATIONS

This application is a continuation under 35 U.S.C. § 120 of International Application No. PCT/GB2021/050956, filed Apr. 21, 2021, which claims priority to Great Britain Patent Application No. 2005974.7, filed on Apr. 23, 2020, under 35 U.S.C. § 119(a). Each of the above-referenced patent applications is incorporated by reference in its entirety.

BACKGROUND OF THE INVENTION

Technical Field

Embodiments disclosed herein relate to a method and system for managing a plurality of resources in a digital environment, in particular, for managing resources in a cloud computing environment.

Background

Cloud computing environments enable multiple computing resources to be accessed remotely and even enable devices to independently access shared resources, such as physical computing devices or virtual machines, servers, device memory and storage devices. Digital environments which make use of such cloud computing environments allow multiple users from different businesses, sometimes in different locations, to access and make use of a single cloud computing environment to participate in tasks.

Using a cloud computing environment for multiple users enables the sharing of resources, thereby optimising the number of resources required. However, enabling users to access shared resources in a cloud computing environment, can introduce a number of problems and limitations which, for certain digital environments, are not ideal. For example, enabling multiple users from different locations to access the same cloud computing environment and resources increases the chance of data breaches, thus limiting the types of digital environment which can be implemented using a cloud computing environment.

SUMMARY

According to a first aspect of the present disclosure, there is provided a method of managing a plurality of resources in a digital environment via a framework, the framework comprising an application programming interface (API), an intermediary component for proxying communication between the API and the resources; and at least one isolated network segment comprising the plurality of resources associated with the digital environment; the method comprising the steps of receiving through the API, an input requesting a state of the digital environment, and characteristics associated with the plurality of resources; providing the characteristics of at least one of the plurality of resources to the intermediary component; and configuring, by the intermediary component, at least one of the resources based on the one or more characteristics.

Advantageously, the method enables multiple resources to be accessed by a user device when undertaking a task. The resources are instantiated within isolated network segments representative of digital environments, such as a virtual private cloud, and may be configured based on characteristics provided with a configuration command. This allows each resource to be provisioned and configured based on the requirements of the task, and also allows each resource to provide an indication when it has been initialised.

The characteristics may include data such as an internet-protocol (IP) address which can be used to define communication links between resources and the intermediary component. This allows resources, that are provided by different cloud computing service providers or that are assigned to different isolated network segments, to communicate. Current systems are not able to seamlessly facilitate communication between such resources. By defining communication channels based on characteristics, such as an IP address, assigned during the configuration process, a communication link can be provided between the resources and the intermediary component. The intermediary component acts as a manager proxying communications between resources. Alternatively and/or additionally, a direct communication channel can be established between a resource of a first isolated network segment and a resource of a second isolated network segment, regardless of whether the two isolated network segments are provided by the same cloud computing service provider.

Preferably, the intermediary component is located within the isolated network segment such that the intermediary component proxies communications between the API and the resources within the isolated network segment. This enables each isolated network segment to have its own intermediary component thereby limiting external access to the network increasing security.

The API can receive messages comprising user inputs, in which case the user inputs are communicated to at least one of the plurality of resources through the intermediary component based on the configuration of the resources. This provides a generic interface with the framework, enabling user inputs, via a user device, to be passed to the one or more resources, regardless of the type of user device, the application the user is providing the inputs to, and/or the type of input sent from the device.

The step of configuring may involve sharing characteristics between the intermediary component and at least one of the resources and adjusting one or more properties of the resource. This enables a user and/or application to configure resources by passing user/application defined characteristics with the input which are subsequently used to configure the resource by adjusting properties of the resource in accordance with the characteristics.

Preferably, the properties of the resource comprise at least one of an internet-protocol address, a definition of at least one communication link between two or more resources; a definition of a communication link between at least one of the resources and the intermediary component; configuration of a firewall; an action to be undertaken by the resource; and a response to provide upon receipt of a user input. Because these properties can be adjusted, the resources can be configured according to the requirements of a given task, such as by enabling communication between resources either within the same or different isolated network segments, and the intermediary component. The communication may be provided by using communication channels based on IP addresses assigned to the resources as part of the configuration process.

The intermediary component may receive an indication from at least one of the plurality of resources of the completion of a task within the digital environment. For example, the method may involve sending, from the intermediary component and through the API, a completion indicator indicative of the completion of the task. The completion of the task may include the completion of the initialisation process of the resource during set-up of the isolated network segment. This two-way communication enables secure, efficient and automatic completion notifications to be sent by the resource and verified by the intermediary component without the need for users to undertake a separate task/test to confirm completion.

The framework may be arranged to manage resources in a plurality of digital environments, in which case the intermediary component is conveniently arranged to manage communication between the API and the plurality of resources within at least one of the digital environments.

Preferably, the intermediary component is arranged to control communication between resources of a first digital environment and resources of a second digital environment. These features ensure that the intermediary component is capable of handling user inputs associated with multiple different digital environments, whether those user inputs originate from the same user device or different user devices by proxying communications and routing them to the desired digital environments and resources within.

The plurality of resources may be virtual machines. The digital environment may be representative of a computer network. The virtual machines represent computer systems, and the digital environment represents a computer network for use in a task, and as such reduce the required amount of physical hardware required to implement the task.

According to other aspects of the present disclosure, there is provided a system configured to perform the method steps set out above and computer software comprising instructions which, when executed, cause a computing device to perform the method steps set out above.

DESCRIPTION OF THE DRAWINGS

Further features and advantages of the disclosure will become apparent from the following description of preferred embodiments of the disclosure, given by way of example only, which is made with reference to the accompanying drawings, in which like features are denoted by like reference numerals.

DETAILED DESCRIPTION

Figure 1:
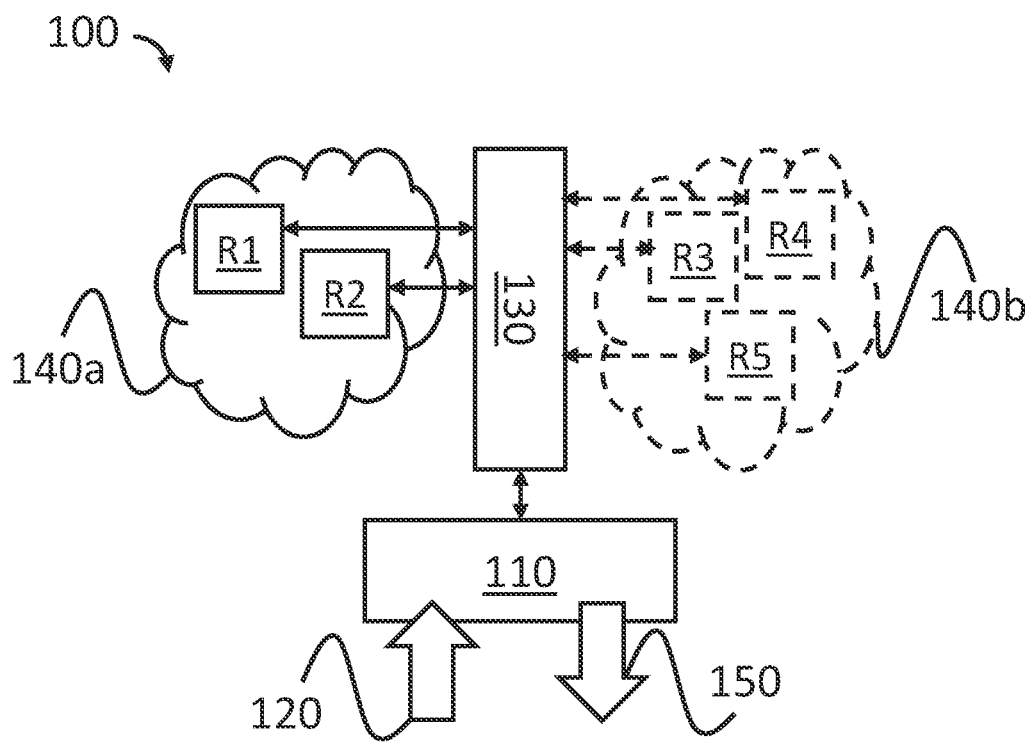
FIG. 1 shows a framework for managing resources in digital environments according to an example.

Embodiments described herein relate to methods and systems for managing resources in a digital environment, in particular, managing resources in cloud computing environments.

Cloud computing is a model for service delivery enabling on-demand network access to shared resources, including processing power, memory, storage, applications, virtual machines and service, that can be instantiated and released with minimal effort and/or interaction with the provider of the service.

The cloud computing paradigm enables provisioning of computing capabilities, such as server time and network storage automatically and as needed without requiring user interaction with the service provider. Cloud computing enables the service provider's resources to be pooled and to serve multiple consumers by dynamically assigning and reassigning physical and virtual resources on demand. Examples of such services include Amazon Web Service™ (AWS), Microsoft Azure, and Google Cloud Platform. The ability to provision the computing capabilities and dynamically assign and reassign the resources enables location independence. A user of the service generally has no control or knowledge over where the provided resources are located, or in some examples where multiple service providers are used, which service provider is providing the resources.

Cloud computing environments enable quick and cost-effective expansion and contraction of resources, thereby enabling users of such a service to control and manage costs and capabilities of their environment. This is particularly useful for companies which enable multiple users to access an online service. Such services are often referred to a Software as a Service (SaaS), and enable a user to access applications running on a cloud infrastructure. The applications are accessed from various client devices through a basic interface, such as a web browser.

As mentioned above, cloud computing environments are used to provide remote access to a number of different resources, including virtual machines. A virtual machine is an emulation of a computer system and provides the functionality of a physical computing device. There are two types of virtual machine: a first type is a system virtual machine which presents itself as a physical computing device and provides the functionality required to execute an entire operating system. For this type of virtual machine, the cloud computing environment may use a hypervisor to share and manage other cloud computing resources, such as hardware, thereby enabling multiple virtual machines to be located within the cloud computing environment, and enable each virtual machine to be sufficiently isolated from another. The second type of virtual machine includes process virtual machines which are used to execute applications in a platform-independent environment. For this type of virtual machine, the cloud computing environment uses a host operating system to support s single process which is started when requested and destroyed when the application is closed. Process virtual machines provide a platform-independent, and homogenous programming environment which enables a program to execute in the same way on any platform regardless of the hardware and operating system of the cloud computing environment. Whilst the examples below refer to the managing of components within a cloud computing environment, it will be appreciated that other environments may be used, such as a collection of servers within a local area network (LAN).

Digital environments, such as digital training environments enable users to develop and enhance their skills in a particular area, as well as keep up-to-date regarding any developments, issues and solutions in said area. Some digital environments combine multiple topics and enable users to undertake tasks covering those areas. Furthermore, digital environments allow management teams to track the progress of particular users to ensure a standard level of competence is achieved across their workforce, and where necessary provide updates and additional tasks in particular areas.

A single digital environment may be provided as a platform for multiple companies to provide activities in a particular area for individual or groups of employees, and as such being able to separate the tasks on a per company, per team or even per employee basis is of paramount importance. Furthermore, it is necessary to ensure that there are sufficient resources available to provide the required task. For example, a business with 500 employees who all must undertake a particular task will have higher resource requirements than a business with five employees who need to undertake the same task. Similarly, different tasks may also have different requirements, such as a task which requires multiple virtual machines versus a task which only requires a single virtual machine. By providing a digital environment which makes use of a cloud computing infrastructure, the digital environment is able to dynamically assign and reassign resources, such as virtual machines, or other platform-independent applications, thereby enabling resource usage to be increased, and costs to be decreased.

FIG. 1 shows schematically a framework 100 for managing resources in a digital environment according to an example. The framework 100 comprises an application programming interface (API) 110, an intermediary component 130, and at least one isolated network segment 140a, 140b.

The API 110 is arranged to receive one or more commands 120 from a user device (not shown). The user device may be a remote device, such as a desktop computer, mobile telephone, or other device, arranged to communicate with the framework 100 through a network connection, such as via the internet, or a direct connection to a server or other computing device capable of running the framework 100. The user device may access the resources associated with the framework 100 via a software program such as a web browser or application installed on the user device which facilitates the connection to the framework 100 via the API 110. For example, if a user initiates an exercise within a digital environment, the user device will send commands to the framework 100 which will initiate the digital environment and any resources required by the digital environment. The framework 100 can also facilitate commands for interacting with and participating in the exercise using the resources.

As such, the API 110 supports multiple commands 120 for interacting with one or more resources associated with the framework 100, including initiation commands and interaction commands. Such commands are received from a user device as indicated by arrow 120, into the API which in turn enables the framework 100 to process the commands using an intermediary component 130.

As mentioned above, the framework 100 comprises at least one isolated network segment 140a, 140b. An isolated network segment is a collection of resources R1-R5, such as a virtual private cloud in an environment provided by AWS or a VNet in an environment provided by Azure, which are interconnected in a virtual network specified on instantiation. The isolated network segment enables the resources of one user and the resources of another user to be separated whilst existing on the same network, or even within the same cloud environment. This may be implemented through the allocation of a private IP subnet or set of encrypted communication channels which serve to isolate the resources on a per user basis. The following examples describe embodiments with reference to an isolated network segment, however it will be appreciated that any computing environment, cloud-based or otherwise, may be used. Each isolated network segment 140a, 140b may represent a different digital environment, such as the digital environment for running a task for a single user, or multiple users concurrently. Alternatively, each isolated network segment 140a, 140b may comprise multiple digital environments having one or more resources R1-R5 for use by multiple users from different companies. For example, where a provider creates a particular activity, such as a task, multiple companies may wish their employees to participate in that particular task, and as such, different users, from different locations and different companies may access the same isolated network segment to participate in the said task. Alternatively, where some degree of isolation is required, for example, the task has been modified for a particular company, multiple users from that company may access the modified version of that task which is associated with its own isolated network segment. Further still, the task may be customised for each individual user, and as such, each individually customised task may be associated with its own isolated network segment. As mentioned above, the ability for cloud computing environments to provision and reassign resources dynamically enables such flexibility.

The resources R1-R5 are used by the user for undertaking various tasks. For example, one or more resources R1-R5 may be used as a virtual representation of a computer network for the purposes of undertaking a test or other task, such as sandboxing a scenario or checking the robustness of a computer system. Each of the resources R1-R5 may be individually provisioned from external hardware (not shown) and accessed via the isolated network segment 140a, 140b. When a user wishes to instantiate a task, the associated resources R1-R5 may be provisioned from the external hardware and provided within a particular isolated network segment 140a, 140b. An indication 150 may be provided via the intermediary component 130 and API 110 to indicate the completion of the initialisation of the resources R1-R5. The isolated network segment 140a, 140b may be used to define the interactions between those resources R1-R5, and as described above, may provide resources for any number of tasks at the same time, each task being accessible by different users.

The intermediary component 130 is arranged to manage the resources R1-R5 associated with framework 100 and facilitate communication with and/or between the resources R1-R5 and the user device via the API. The intermediary component 130 as described in the examples below is located outside of the isolated network segment 140a, 140b, however, it will be appreciated that the intermediary component 130 may form part of the isolated network segment 140a, 140b, such that the intermediary component is arranged to proxy communications between the API and the resources R1-R5 within the isolated network segment 140a, 140b. Furthermore, the intermediary component 130 may comprise components, some of which form part of the isolated network segment 140a, 140b and some of which are remote to the isolated network segment 140a, 140b. The intermediary component 130 receives commands via the API 110, and in turn, communicates with the necessary resources R1-R5 and in some examples, hardware (not shown) external to the framework 100. Details regarding the enablement of user interaction with the resources R1-R5 will be described in further detail below. Accordingly, the intermediary component 130 is arranged to proxy communications between the API 110 and the one or more resources R1-R5 within a given isolated network segment 140a, 140b, enabling, for example, multiple users to interact with the same or separate resources within the same digital environment, or enable a single user to interact with resources in different digital environments.

Users may not only use the framework 100 for interacting with resources R1-R5 in the isolated network segments 140a, 140b as indicated by the arrows, but may also use the framework 100 to initialise the resources R1-R5 via the intermediary component 130, and upon completion of the initialisation of the resources R1-R5, an indication may be provided to the user via the API 100. When a user is undertaking a task, commands can be sent from a user device (not shown) via the API 110 and the intermediary component 130 to each of the resources R1-R5 for further processing, and any responses are sent back to the user device via the intermediary component 130 and the API 110. Similarly, where tasks require the interaction of multiple resources R1-R5 across multiple digital environments, the isolated network segment 140a, 140b and intermediary component 130 may be configured to allow interaction between the resources R1-R5 in a single isolated network segment 140a, 140b, as and when required. In some examples, the intermediary component 130 enables the resources R1-R5 of separate isolated network segments 140a, 140b to communicate with each other. This may be achieved by configuring the resources R1-R5 as will be described in further detail below with reference to FIG. 2.

In some examples, the resources R1-R5 pass parameters back to the user device (not shown) via a return command 150. Such return commands 150 may indicate the completion of a task, and or other actions required to be undertaken by the user to progress the task. The return command 150 may also indicate the completion of the initialisation of the resources R1-R5. The return commands are provided from the resources R1-R5 to the API 110 via the intermediary component 130, the API 110 then provides them to the user device.

Providing the intermediary component 130, in and of itself separates the API 110 from the resources R1-R5, thereby increasing security by preventing direct access to the individual resources R1-R5. Security is further increased when the intermediary component 130 is provided as part of an isolated network segment 140a, 140b, since all interactions within are undertaken within the isolated network segment 140a, 140b, and external communication is only undertaken via the intermediary component 130. This is particularly important for certain tasks, especially when the tasks relate to security, and intrusion detection and prevention, where the aim of the task is to obtain unauthorised access to one or more of the resources R1-R5. The intermediary component 130 therefore, polices any commands sent via the API 110 before passing the commands onto the individual resources R1-R5.

Figure 2:
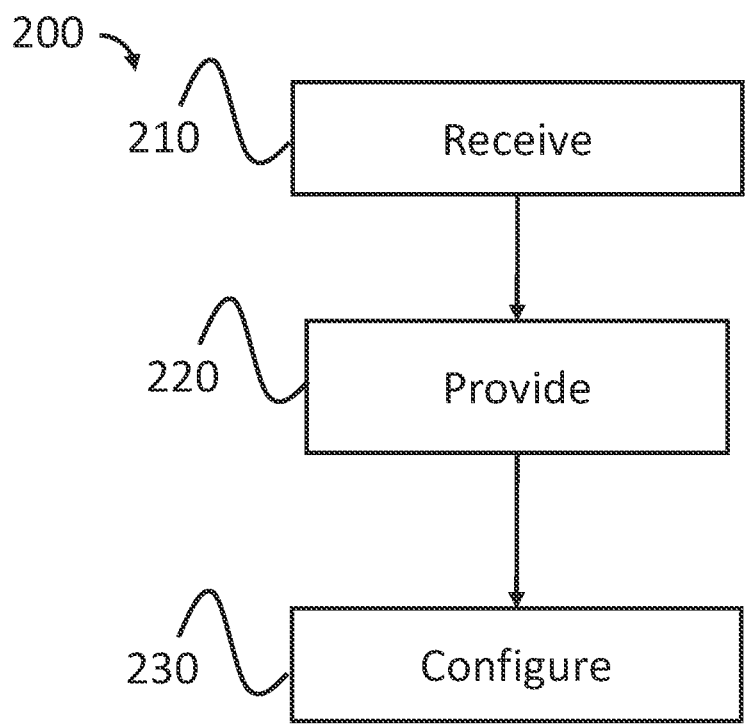
FIG. 2 is a flowchart showing a method of initialising resources in a digital environment.

FIG. 2 is a flowchart 200 showing a method of initialising resources in a digital environment according to an example. The process of initialising resources is undertaken using the framework 100 described above with reference to FIG. 1.

At step 210, an input is received from a user device. The input, such as command 120 shown in FIG. 1, is received via the API 110. By receiving the commands through the API 110, a generic interface with external devices can be used. This enables multiple different types of user device, having different operating systems and requirements, to interact with the framework 100. By using generic commands, interaction with the framework 100 is simplified and access from different locations, and using devices with different capabilities, hardware and/or software is enabled.

The API 110 is able to handle a number of different commands 120, including requests to initialise a digital environment comprising one or more resources R1-R5, such as an isolated network segment 140a, 140b. The user device may access the digital environment and resources R1-R5 via a software program such as a web browser or other application installed on the user device which facilitates connection to the framework 100 via the API 110. For example, a user may wish to run an exercise within a digital environment, in which case the API 100 will facilitate commands for initiating the digital environment and any resources required by the digital environment, as well as commands for interacting with and participating in the exercise using the resources via the intermediary component 130.

As such, the API 110 is capable of supporting multiple commands 120 for initialising and interacting with one or more resources R1-R5 associated with the framework 100. One command may comprise a request for a state of the digital environment, and also comprise characteristics to be associated with the requested resource R1-R5 of the digital environment. For example, the characteristics of the resource can include a type of virtual machine or container, such as Kubernetes or a Microsoft Windows® virtual machine, data to be stored in storage associated with the virtual machine, configuration information, such as an Internet Protocol (IP) address associated with the resource, information pertaining to other resources which form part of a virtual network of the digital environment, and the capabilities of the particular resource.

Upon receipt of a command via the API 110, the API may request a state of the digital environment, and characteristics associated with a plurality of resources. The characteristics are then provided to an intermediary component, such as intermediary component 130 of FIG. 1 at step 220. Upon receipt of the state and the characteristics, the characteristics are provided to the intermediary component. The intermediary component is responsible for configuring the resources associated with the digital environment. As mentioned previously, these characteristics may include a type of virtual machine or container, such as Kubernetes, or a Microsoft Windows® virtual machine, data to be stored in storage associated with the virtual machine, configuration information, such as an IP address associated with the resource, information pertaining to other resources which form part of a virtual network of the digital environment, and capabilities of the particular resource. Therefore, the intermediary component 130, is capable of parsing the characteristics and determining the properties of the resources within a particular digital environment.

Once the intermediary component has been provided with the characteristics associated with one or more required resources, and the required resources have been initialised within the digital environment, the method 200 progresses to step 230 where the resources are configured according to the characteristics. Each resource R1-R5 has a number of configurable properties, such as an IP address, firewall configurations, and/or actions to undertake in relation to one or more tasks. Accordingly, step 230 involves configuring one or more of these properties for the required resources, as will now be explained, with reference to an example.

As mentioned above, the characteristics may include an IP address. In this case, a resource may be initialised and the IP address property of the resource set according to the IP address characteristic provided as part of the input. By setting the IP address of each resource R1, R2, a communication channel between a first resource R1 and a second resource R2 can be defined with reference to the IP address provided to each resource R1, R2. In this example, the communication channel presents a connection state for both resources R1, R2, and may be considered to be a property of both resources R1, R2. It will be appreciated that the communication channel need not be a one-to-one communication channel, but may instead by a one-to-many communication channel, and as such, the communication state is representative of a communication link which originates at a resource with respect to the resource or resources at which the link terminates. Furthermore, during initialisation, multiple different communication channels representing differing communication links associated with a resource may be instantiated, and the communication state of a resource can be said to represent all communication channels associated with the resource.

In this way, resources R1-R5 may be configured such that there is a communication link between more than two resources, thereby setting up what may be referred to as intra-cloud communications between two or more resources within a single isolated network segment 140a, 140b. Such intra-cloud communications mean that user interaction with one resource R1 causes a second resource R2 within the same isolated network segment 140a, 140b to undertake a particular action. In other examples, communication states are provided based on a communication link between the resource R1-R5 and the intermediary component 130 directly to enable commands to be passed from a user device via the API to the resources R1-R5, and vice versa. This enables a user to interact with the resources R1-R5, such as undertaking a task in the digital environment by sending commands from their device to the resource via the API, and also receive indications from the resources R1-R5. By enabling two-way communication between user devices and resources R1-R5, the indications can be used to signal an event within the digital environment, such as the completion of a task, without the need for a user to undertake a secondary task to confirm completion, such as a multiple-choice test, questionnaire, and/or check to ensure the resources have been properly configured.

Further examples of properties which are configurable based on the characteristics of a command include, the configuration of a firewall associated with the resource R1-R5, actions to be undertaken, and responses to be provided by resources R1-R5 upon receipt of a given command from a user device via the API 110.

In some examples, the framework 100 described above in relation to FIG. 1 and the method described above in relation to FIG. 2 are used to initialise a plurality of digital environments in different isolated network segments 140a, 140b, or even in the same isolated network segment 140a. In such a scenario, the intermediary component 130 manages communications between the API 110 and the different digital environments. In one example, the intermediary component 130 acts as a router interpreting the commands and directing them to the desired resources R1-R5, via the communication links established between the individual resources R1-R5 and the intermediary component 130 as described above. As such, the intermediary component 130 manages communications between the resources R1, R2 of a first digital environment in a first isolated network segment 140a, and resources R3-R5 of a second digital environment in a second isolated network segment 140b.

Previously, when isolated network segments and resources are instantiated using different cloud computing services, such as a first virtual machine being provided by AWS and a second virtual machine being provided by Microsoft Azure, direct communication between them is not possible. This also applies to different isolated network segments set up using the same cloud computing service provider. Therefore, without configuration, a virtual machine instantiated using AWS is unaware of another virtual machine which has been instantiated using Microsoft Azure or any other cloud computing service. As such, according to embodiments disclosed herein, the intermediary component 130 is capable of managing communication with the resources R1-R5, and, following configuration, enables direct communication between resources R1-R5 set up in different isolated network segments using different cloud computing service providers, or the same cloud computing service provider via communication channels between the resources R1-R5. Alternatively, following configuration of the resources, communication between resources R1-R5 set up using different cloud computing services is enabled via the creation of communication channels between individual resources R1-R5 and the intermediary component 130, as will be described in further detail below with reference to FIG. 6.

Establishing communication between resources, whether in the same isolated network segment 140a, 140b or different isolated network segments 140a, 140b, enables user interaction with a resource R1, R2 of one isolated network segment 140a to impact the behaviours and abilities of resources R3-R5 of a second isolated network segment 140b. Alternatively, and/or additionally, such inter-cloud communication may be set up during the configuration of the resources R1-R5. As described above, during configuration of the resources R1-R5, the input may comprise characteristics, including an IP address. The resource may be initialised and the IP address property of the resource set according to the IP address characteristic provided as part of the input. By setting the IP address of each resource R1-R5, a communication channel between a first resource R1 and a second resource R5 can be defined, as explained above.

In some examples, the resources R1-R5 may be pre-existing and at least partially configured within an already instantiated isolated network segment 140a, 140b. Certain tasks may require a user to access the pre-existing resources R1-R5, for example, the pre-existing resources may represent a remote server within a task for access by multiple users at the same time. These pre-existing resources R1-R5 may be accessed by the user via the intermediary component 130 by establishing one or more communication links between a pre-existing resource R1-R5 and the intermediary component 130 and updating the communication state associated with the pre-existing resource R1-R5. When adding a pre-existing resource R1-R5, other properties of the resource may also be customised based on particular user and/or task requirements, such as user interface adjustments to correspond to the user device or other user settings.

Figure 3:
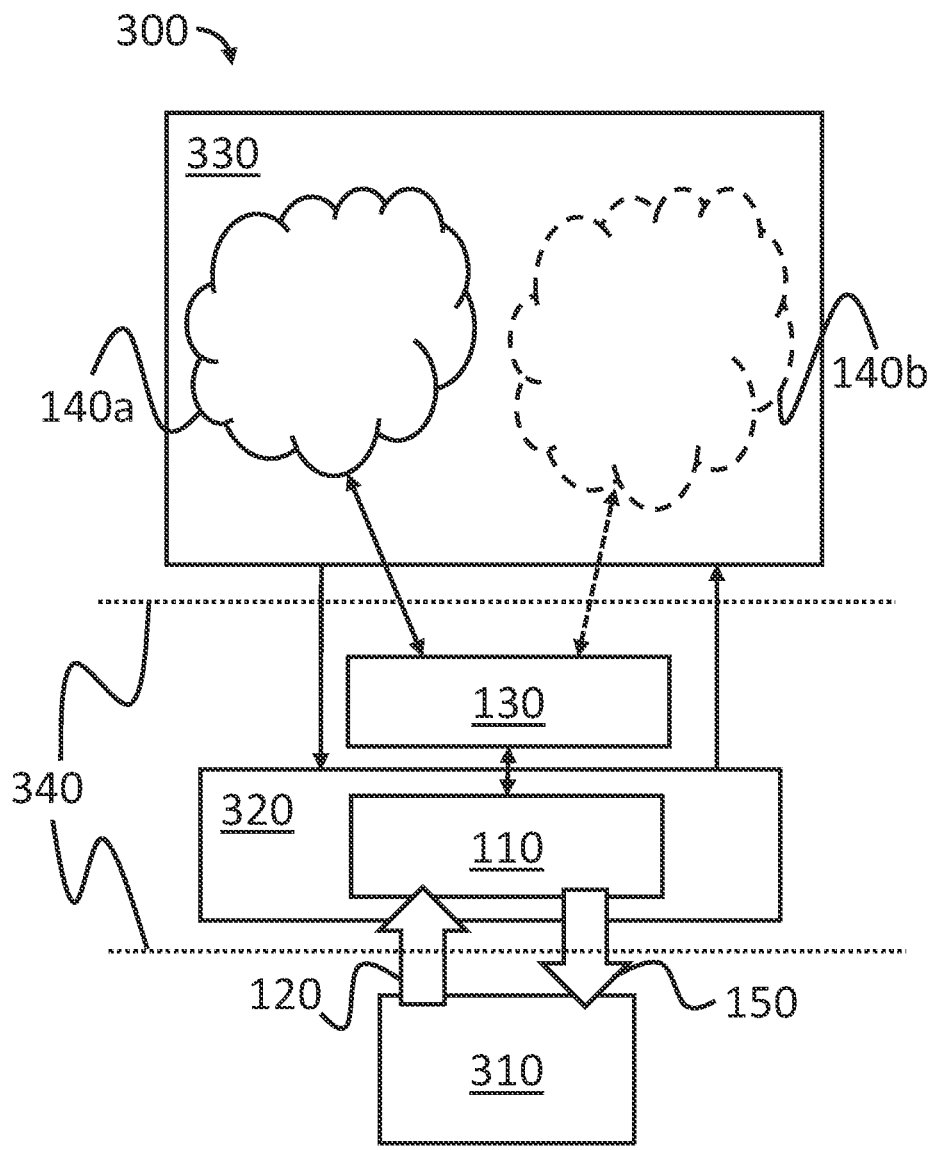
FIG. 3 shows a system for managing resources in a digital environment according to an example.

FIG. 3 shows a system 300 comprising hardware components configured for operating the framework 100 described above in relation to FIG. 1. The system 300 comprises a user device 310 for interacting with a digital environment. The user device 310 may be any suitable device for receiving user inputs. For example, the user device may be a mobile telephone, a hand-held or laptop device, a desktop computer, a multiprocessor system, a microprocessor-based system, or a programmable consumer electronic device comprising an appropriate input method, such as a touch screen, a pointing device, keyboard, or trackpad. It will be appreciated that other types of user device 310 and input methods may be used. The user device 310 is configured with an operating system suitable for executing an application for interacting with the resources within the digital environment. The application may be a bespoke application designed specifically to run on the operating system of the user device 310. Alternatively, the application may be a web browser capable of handling a rich-web application which in turn is used to interact with the digital environment. Since the resources are remote from the user device 310, the user device 310 will be arranged to communicate with any number of remote resources via a network such as a local area network (LAN), a general wide area network (WAN), and/or a public network (e.g. the Internet) via a network adaptor, as will be explained in further detail below. The network adapter may be configured to communicate using either a wired or wireless communication method, such as cellular connectivity (LTE, 3G, 4G, or 5G), ethernet, or over a Wi-Fi network.

The system 300 also comprises an intermediary server 320, which may be configured on the same network as the user device 310 or alternatively may be accessed via an external network 340 such as the internet. The intermediary server 320 comprises an API 110 for interacting with the user device and the remote server 330 as will be described below via the intermediary component 130 described above in relation to FIGS. 1 and 2. In some examples, the intermediary component 130 forms part of the intermediary server 320, and in other examples the intermediary component 130 may be a virtual component associated with at least one of the isolated network segments 140*a*, 140*b*. In yet further examples, the intermediary component 130 may comprise some aspects which are virtual and form part of the isolated network segments 140*a*, 140*b*, and other aspects which form part of the intermediary server 320. Furthermore, the intermediary component 130 may be located on a server remote from the intermediary server 320. The API 110 is arranged to receive commands 120 from and send commands 150 to the user device 310. The intermediary component 130 is arranged to proxy the communications received from the user device 310 via the API 110, and also proxy communications received from the digital environments and resources in them.

The system 300 also comprises at least one remote server 330 for providing at least one isolated network segment 140*a*, 140*b*, such as a virtual private cloud representative of the digital environment. The remote server 330 may be an AWS server or other server provided by an alternative cloud services provider; furthermore, multiple remote servers may be used, each being provided by a separate cloud computing service provider. The remote server 330 facilitates the dynamic creation of isolated network segments 140*a*, 140*b* and instantiates, within each of the isolated network segments 140*a*, 140*b*, at least one resource (not shown). As mentioned previously, the resources may include virtual machines, containers, and remote storage, or any combination of resource which can be dynamically instantiated and assigned by the remote server 330 on demand. The resources within the isolated network segments 140*a*, 140*b* are configured based on one or more characteristics provided in an input to the intermediary component via the API 110 from the user device. As described above, the characteristics include an IP address which is used to configure a property of the resource. Following this configuration, and indication of the completion of the configuration process may be provided to the user via the API 110, and a communication channel may be set up, using the IP address, between two or more of the resources within a single isolated network segment, between the resource and the intermediary component 130, or between two or more resources in separate isolated network segments. Therefore, the communication channel is associated with a communication state, defined during the configuration process and based on the IP address provided to the resource. Accordingly, the isolated network segments 140*a*, 140*b* represent a virtual network of resources illustrative of a real-world network configuration. Following configuration, the resources within the isolated network segments 140*a*, 140*b* can interact directly with the intermediary component 130 and other resources, via the communication channel set up during configuration.

FIGS. 4-8 shows schematically the flow of commands for initialising and interacting with a system, such as system 300 in various exemplary digital environments.

Figure 4:
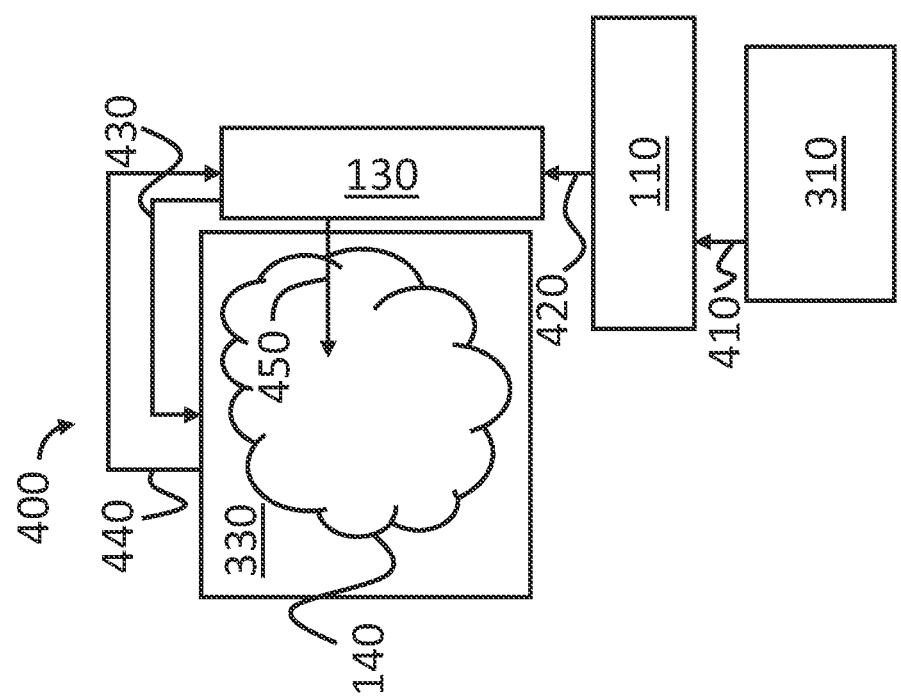
FIG. 4 shows schematically the flow of commands for initialising a digital environment in the system of FIG. 3.

FIG. 4 shows schematically the flow of commands 400 for initialising a digital environment in accordance with an example. As mentioned above, a user device 310 interacts with an intermediary server, such as server 320 of FIG. 3 or server 130 of FIG. 1, comprising an intermediary component 130 via an API 110. During configuration of the digital environment, a user sends an input, such as a command 310 from a user device. A command 410 may be sent when a user begins a particular task which requires one or more resources of a remote server 330, such as a virtual machine or container. The command 410 is sent from an application on the user device 410 and as such may not be compatible with the requirements of the remote server 330 and/or the intermediary component 130. Accordingly, in some examples, the API 110 translates the command 410 into a compatible format. Therefore, the use of the API 110 enables multiple different types of application to interact with the remote server 330 and/or intermediary component 130.

The command 410 is passed through the API 110 and may be translated by the API 110 into a translated command 420 which is passed to the intermediary component 130. As mentioned previously with reference to FIG. 1-3, the command 410 comprises not only a request for particular resources but also comprises characteristics of those resources, such as an IP address, which are used to configure the resources by adjusting one or more properties of the resource. Once received by the intermediary component 130, the command whether translated 420 or not 401 is parsed to determine what resources are required from a remote server 330, such as AWS. The intermediary component 130 then sends an instantiation request 430 for the desired resources from the remote server 330 which includes the instantiation of an isolated network segment 140, representative of a virtual network, containing the resources (not shown). Upon instantiation of the isolated network segment 140, a response 440 is sent by the remote server 330 to the intermediary component 130 indicating that the required resources have been instantiated. In some examples, the response 440 may be a completion indicator which is passed back to the user device 310 to indicate that the resources have been successfully instantiated. Sometimes, part of the instantiation request comprises a configuration and/or set up of the individual resources, for example, to enable communication with between resources, and between a resource and the intermediary component 130, as will be now be described with reference to an example.

A request 430 comprises, in particular, an IP address, which is used to establish a communication channel with the resource. The communication channel can represent a communication link between a resource and the intermediary component 130 or a communication link between a resource and one or more other resources. Multiple communication channels may be initialised during configuration, and form part of a communication state associated with the resource. This may be stored as a property of the resource. Following instantiation of the communication channel, the intermediary component 130 communicates with the resources via a communication link set up on configuration based on the IP address assigned to the resource and an IP address associated with the intermediary component 130. The communication link enables commands 450 to be sent between the intermediary component 130 and the resources directly. Further configuration of the resources is achieved by adjusting other properties of the resource-based on characteristics provided with the command 410 or other commands via the communication channel(s). The communication channel(s) set up during the configuration process for a given resource may also be used to facilitate user interaction with the resources via a command 450 sent from the user device 310 via API 110 and intermediary component 130. Additionally, commands sent to a first resource, from a user device 310 via the API 110 and the intermediary component 130, may result in an action at a second resource, when a communication channel is between the first resource and the second resource.

Figure 5:
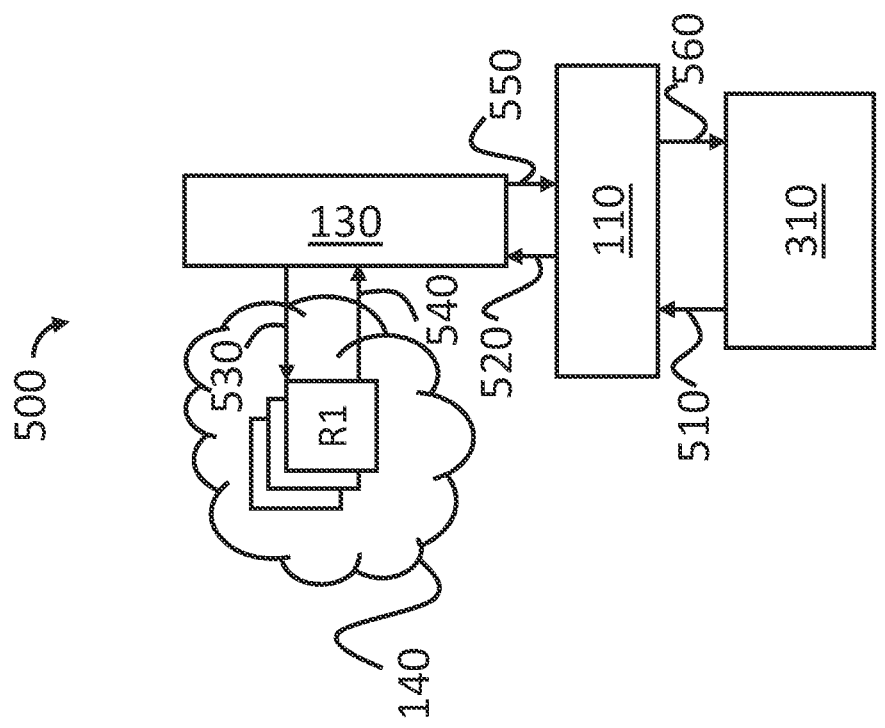
FIG. 5 shows schematically the flow of commands for interacting with one or more resources according to a first example.

FIG. 5 shows schematically the flow of commands 500 for interacting with one or more resources according to an already initialised digital environment. The digital environment of FIG. 5 comprises at least one resource R1 in an isolated network segment 140. A user, via a user device 310 interacts with the resources R1 of the digital environment via a user device 310 by sending commands 510 to the intermediary component 130 via an API 110. The API 110 can translate the commands 510 into a format 520 suitable for the intermediary component 130. The intermediary component then proxies or further modifies the communication with the resources R1 in the isolated network segment 140. A message 530 comprising at least the translated command 520 is sent from the intermediary component 130 to one or more of the resources R1 via a communication channel between the one or more resources R1 and the intermediary component 130, which was established during the configuration of the one or more resources R1. As described above, the communication channel between the one or more resources R1 and the intermediary component 130 is obtained from the communication state of the one or more resources R1. The communication state of the one or more resources R1 which contains the different communication channels set up based on the IP address(es) assigned to the one or more resources during the configuration process. The resource R1 will process the message and in some examples, send a return message 540 to the intermediary component 130, again via the pre-established communication channel. For example, where the user is participating in a particular task, a return message 540 can indicate that the task has been completed. The intermediary component 130 may verify the completion of the task, and/or may send 550 the return message 540 back to the API 110 which in turn forwards 560 the message onto the user device 130. As with the sending of commands, the API 110 is able to translate the command into a format suitable for the user device 110.

Figure 6:
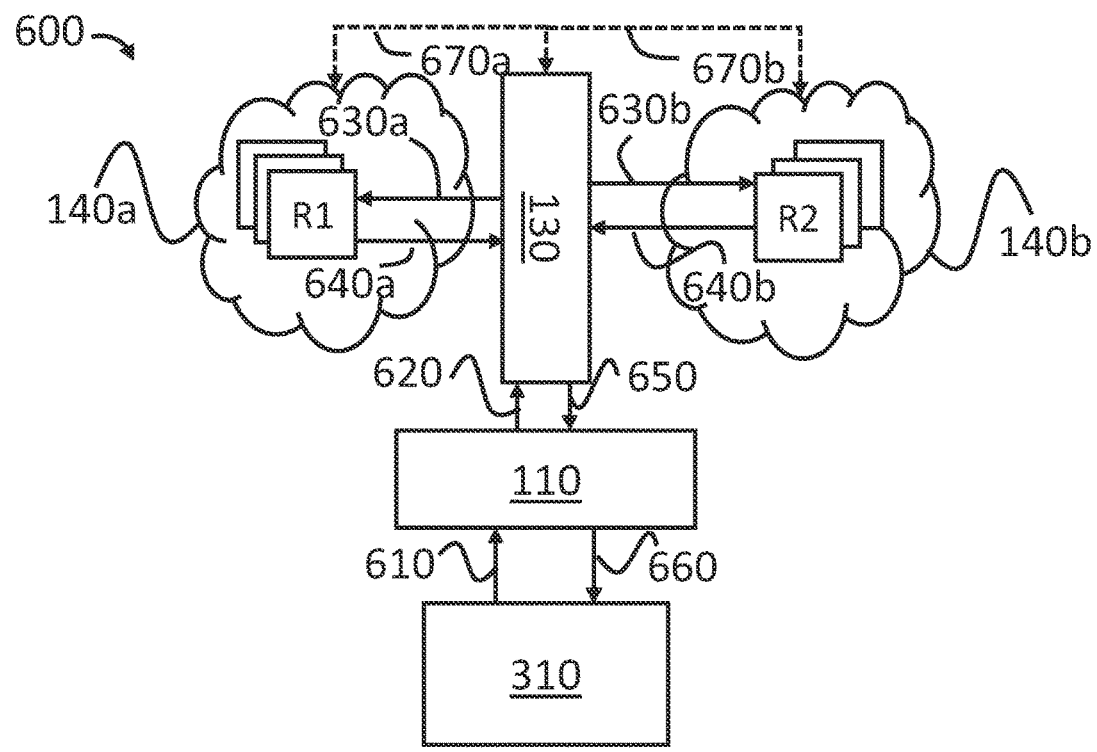
FIG. 6 shows schematically the flow of commands for interacting with one or more resources according to a second example.

FIG. 6 shows schematically the flow of commands 600 for interacting with one or more resources according to an already initialised digital environment. The digital environment of FIG. 6 comprises two isolated network segments 140a, 140b each comprising at least one resource R1, R2. The two isolated network segments 140a, 140b may represent different tasks a user of a user device 310 is required to undertake. As described above in relation to FIG. 5, a user device 310 sends a command 610 to an intermediary component 130 via an API 110 which may translate the command 610 into a format 620 suitable for the intermediary component 130. The intermediary component 130 then proxies the commands and determines which of the resources R1, R2 the command is to be sent to. If the command is addressed to the resource R1 of the first isolated network segment 140a, such as by using the IP address assigned to resource R1 during initialisation, then the command is forwarded 630a to resource R1 via a communication link defined in a communication channel between resource R1 and the intermediary component 130, and stored in the communication state associated with resource R1. As above a response, 640a may be returned, via the same communication channel which passes through the intermediary component 130 and API 110 to the user device 310 as indicated by message flow arrows 650 and 660. Conversely, if the command is intended for resource R2 of the second isolated network segment 140b, such as been addressed to resource R2 using the IP address assigned during initialisation, the command is forwarded 630b to resource R2. The command is forwarded via a communication link defined in a communication channel between resource R2 and the intermediary component 130 and stored in the communication state associated with resource R2. A response 640b may be returned to the user device 310 via the same communication channel between the resource R2 and the intermediary component 130 and passed to the user device 310 via the API 110 as indicated by message flow arrows 650 and 660.

The resources R1, R2 of the first and second isolated network segments 140a, 140b communicate with one another via the intermediary component 130, by using the communication channels between the resources R1, R2 and the intermediary component 130. Therefore, resource R1 of a first isolated network segment 140a sends a command to a resource R2 of a second isolated network segment 140b via the intermediary component 130. This is particularly useful when the first isolated network segment 140a and second isolated network segment 140b are provided by different cloud computing service providers since the existence of resources in the different isolated network segments 140a, 140b would be unknown by each cloud computing service provider. As such the command 670a is first sent to the intermediary component 130 via the communication channel between resource R1 and the intermediary component 130. The intermediary component 130 parses the command 670a and forwards 670b the command to resource R2 via the communication channel between resource R2 and the intermediary component 130. By sending commands from one resource R1 to another resource R2 via the intermediary component 130, resources 130 which may not be compatible are able to communicate, as the intermediary component can provide translation services to facilitate communication.

Alternatively, or in addition to inter-cloud communications being sent via the intermediary component, a communication channel may be established, during initialisation, between a resource R1 of a first isolated network segment 140a and a resource R2 of a second isolated network segment R2. As explained above, such a communication channel may be established based on the IP address of an originating resource R1, and the IP address of one or more resources R2 where a communication link terminates. Establishing such direct communication via the creation of communication channels between resources R1, R2 based on the IP addresses set during the configuration process previously described, enables resources R1, R2 to communicate without requiring the resources of the intermediary component 130. It will be appreciated that the communication state of a resource R1, R2 may be initialised such that both methods of communication between resources R1, R2 (direct, or indirect, via the intermediary component 130) of different isolated network segments 140a, 140b may be possible, along with specifying a preference as to which method to attempt in the first instance.

Figure 7:
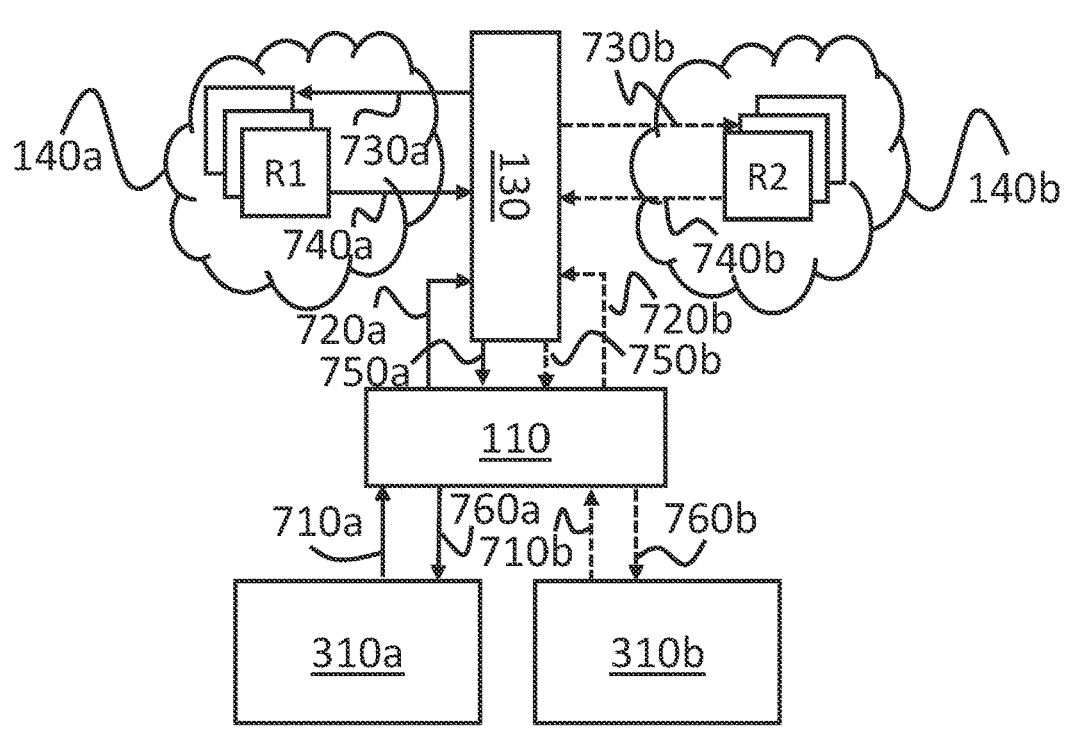
FIG. 7 shows schematically the flow of commands for interacting with one or more resources according to a third example.

FIG. 7 shows schematically the flow of commands 700 for interacting with one or more resources according to an already initialised digital environment. The digital environment of FIG. 7 comprises two isolated network segments 140a, 140b each comprising at least one resource R1, R2. The two isolated network segments 140a, 140b may represent digital environments associated with different user devices 310a, 310b. The digital environments need not be different digital environments; however, each user device 310a, 310b may be associated with a separate instantiation of the digital environment as represented by the use of two isolated network segments 140a, 140b. It will be appreciated that whilst two user devices 310a, 310b are shown to be interacting with separate digital environments as represented by the two isolated network segments 140a, 140b, in some examples, two user devices 310a, 310b interact with a single digital environment represented by a single isolated network segment 140a, 140b such as when a task is a group task.

As described above with reference to FIG. 5, the first user device 310a interacts with resources R1 in a first isolated network segment 140a, as represented by message flow arrows 710a, 720a, 730a, 740a, 750a, and 760a via communication channels associated with resource R1 as defined during the configuration of resource R1. The interaction with the resources R1 of the first isolated network segment 140a is facilitated by the intermediary component 130 and API 110 as described above. At the same time the intermediary component 130 and API 110 may be arranged to facilitate commands received from a second user device 310b to resources R2 of a second isolated network segment 140b as represented by message flow arrows 710b, 720b, 730b, 740b, 750b, and 760b via communication channels associated with resource R2 as defined during the configuration of resource R2. In some examples, it will be appreciated that the first isolated network segment 140a and second isolated network segment 140b require commands to be received in different formats, and as such the intermediary component 130 is able to further translate the commands into the format associated with each isolated network segment 140a, 140b. This is in addition to any translation undertaken by the API 110 to ensure the command is processed and parsed by the intermediary component 130. As described above resources R1, R2 within a given isolated network segment 140a, 140b may communicate with each other. Furthermore, in the example shown in FIG. 7, even though they relate to separate digital environments, it may be desirable to permit communication between resource R1 and R2 even though they relate to separate isolated network segments 140a, 140b. This can be facilitated by the intermediary component 130 or facilitated directly based on the communication states of the resources R1, R2, much in the same way as described above in relation to FIG. 6. In addition, and as explained above each isolated network segment may comprise an intermediary component within it arranged to proxy and manage communications between resources, whether within the same isolated network segment or different isolated network segment, and/or the API.

At least some aspects of the embodiments described herein with reference to FIGS. 1-7 comprise computer processes performed in processing systems or processors. However, in some examples, the disclosure also extends to computer programs, particularly computer programs on or in an apparatus, adapted for putting the disclosure into practice. The program may be in the form of non-transitory source code, object code, a code intermediate source and object code such as in partially compiled form, or in any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example, a floppy disk or hard disk; optical memory devices in general; etc.

It is to be understood that although the disclosure above relates to the use of cloud computing, the implementation described is not limited to a cloud computing environment. Rather, embodiments of the present disclosure are capable of being implemented in conjunction with any other type of computing environment.

In the preceding description, for purposes of explanation, numerous specific details of certain examples are set forth. Reference in the specification to "an example" or similar language means that a particular feature, structure, or characteristic described in connection with the example is included in at least that one example, but not necessarily in other examples.

The above embodiments are to be understood as illustrative examples of the disclosure. Further embodiments of the disclosure are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

The invention claimed is:

1. A method of managing a plurality of resources for executing a task in a digital environment via a framework, the framework comprising:
   an application programming interface, API;
   an intermediary component for proxying communication between the API and the plurality of dynamically instantiable resources; and
   at least one remote server;
   the method comprising the steps of:
      receiving, at the intermediary component and through the API, a command to initialize the digital environment;
      in response to the command, parsing the command to determine a plurality of required resources, and characteristics of the plurality of required resources that are required from the remote server;
      sending to the remote server, an instantiation request comprising the required resources and the characteristics for instantiating at least a first isolated network segment and a second isolated network segment, wherein the first isolated network segment is representative of a virtual network and contains a first resource of the required resources, and the second isolated network segment is representative of another virtual network and contains a second resource of the required resources;
      instantiating, by the remote server and based on the instantiation request, the required resources for executing the task in the digital environment, wherein instantiation of the required resources comprises:
configuring the first resource and the second resource by adjusting one or more properties of the first resource and the second resource based on the characteristics, wherein one or more properties is an internet protocol, IP, address property; and
establishing:
a direct communication channel between the first resource and the second resource, the direct communication channel being configured to facilitate direct communication between the first resource and the second resource; and
an indirect communication channel comprising a first communication channel between the first resource and the intermediary component and a second communication channel between the second resource and the intermediary component, the indirect communication channel being configured to send commands between the first resource and the second resource via the intermediary component; and
wherein the direct communication channel is established by:
setting at least the IP address property of the first resource based on a first IP address characteristic, the first IP address characteristic being one of the characteristics; and
setting the IP address property of the second resource based on a second IP address characteristic, the second IP address characteristic being another one of the characteristics.

2. The method according to claim 1, wherein the API receives messages comprising user inputs, and wherein the user inputs are communicated to at least one of the plurality of resources through the intermediary component based on one or more of the given properties of the dynamically instantiable resource.

3. The method according to claim 1, wherein the intermediary component receives a completion indicator from at least one of the plurality of required resources, of the completion of the task within the digital environment.

4. The method according to claim 1, wherein the framework is arranged to manage the plurality of dynamically instantiable resources in a plurality of digital environments, and wherein the intermediary component is arranged to manage communication between resources of a first digital environment and resources of a second digital environment.

5. The method according to claim 1, wherein the intermediary component is located within at least one of the first isolated network segment or the second isolated network segment, such that the intermediary component proxies communication between the API and the plurality of required resources associated with the first isolated network segment and the second isolated network segment.

6. The method according to claim 1, wherein the plurality of dynamically instantiable resources are virtual machines.

7. A system for managing a plurality of resources for executing a task in a digital environment, the system comprising hardware components:
an intermediary server comprising an application programming interface, API;
an intermediary component for proxying communication between the API and the plurality of resources;
a user device; and
a remote server;
wherein a command is received at the intermediary component, and through the API to initialise the digital environment,
wherein the intermediary component is arranged to:
parse the command to determine a plurality of required resources and characteristics of the plurality of required resources that are required from the remote server;
send, to the remote server, an instantiation request comprising the required resources and the characteristics, for instantiating at least a first isolated network segment and a second isolated network segment, where the first isolated network segment is representative of a virtual network and contains a first resource of the required resources, and the second isolated network segment is representative of another virtual network and contains a second resource of the required resources;
where the remote server is arranged to:
instantiate, based on the instantiation request, the required resources for executing the task in the digital environment, wherein instantiation the required resources comprises:
configuring the first resource and the second resource by adjusting one or more properties of the first resource and the second resource based on the characteristics, wherein one of the one or more properties is an internet protocol, IP, address property;
establishing:
a direct communication channel between a first resource and a second resource, the direct communication channel being configured to facilitate direct communication between the first resource and the second resource; and
an indirect communication channel, comprising a first communication channel between the first resource and the intermediary component and a second communication channel between the second resource and the intermediary component, the indirect communication channel being configured to send commands between the first resource and the second resource via the intermediary component; and
wherein the direct communication channel is established by:
setting at least the IP address property of the first resource based on the first IP address characteristics, the first IP address characteristic being one of the characteristics; and
setting the IP address property of a second resource based on a second IP address characteristic, the second IP address characteristic being another one of the characteristics.

8. The system according to claim 7, wherein the user device sends messages comprising user inputs indicative of an action associated with at least one of the plurality of required resources within the first isolated network segment or the second isolated network segment, and wherein the API is arranged to pass the user input to the at least one of the plurality of required resources.

9. The system according to claim 7, wherein the intermediary component receives a completion indicator from at least one of the plurality of required resources, of the completion of the task within the digital environment.

10. The system according to claim 7, wherein the intermediary server is configured to manage resources in a plurality of digital environments, and wherein the intermediary component is arranged to manage communication between resources of a first digital environment and a resources of a second digital environment.

11. The system according to claim 7, wherein the intermediary component is located within at least one of the first isolated network segment or the second isolated network segment, such that the intermediary component proxies communications between the API and the plurality of required resources associated with the first isolated network segment and the second isolated network segment.

12. The system according to claim 7, wherein the plurality of dynamically instantiable resources are virtual machines.

13. The system according to claim 7, wherein the digital environment is representative of a computer network.

14. A non-transitory computer-readable storage medium comprising a set of computer-readable instructions stored thereon, which when executed by at least one processor are arranged to manage a plurality of resources for executing a task in a digital environment via a framework, the framework comprising:
an application programming interface, API;
an intermediary component for managing communication between the API and the plurality of resources; and
at least one remote server;
wherein the instructions, when executed, cause the processor to:
receive, at the intermediary component, and through the API, a command to determine a plurality of required resources, and characteristics of the plurality of required resources, that are required from the remote server;
send to the remote server, an instantiation request comprising the required resources and the characteristics for instantiating at least a first isolated network segment and a second isolated network segment, wherein the first isolated network segment is representative of a virtual network and contains a first resource of the required resources, and the second isolated network segment is representative of another virtual network and contains a second resource of the required resources;
instantiate, by the remote server and based on the instantiation request, the required resources for executing the task in the digital environment wherein instantiation the required resources comprises:
configuring the first resource and the second resource by adjusting one or more properties of the first resource and the second resource based on the characteristics, wherein one of the one or more properties is an internet protocol, IP, address property; and
establishing:
a direct communication channel between the first resource and the second resource, the direct communication channel being configured to facilitate direct communication between the first resource and the second resource; and
an indirect communication channel comprising a first communication channel between the first resource and the intermediary component and a second communication channel between the second resource and the intermediary component, the indirect communication channel being configured to send commands between the first resource and the second resource via the intermediary component; and
wherein the direct communication channel is established by:
setting at least the IP address property of the first resource based on a first IP address characteristic, the first IP address characteristic being one of the characteristics; and
setting the IP address property of the second resource based on a second IP address characteristic, the second IP address characteristic being another one of the characteristics.

* * * * *